(12) United States Patent
Lea et al.

(10) Patent No.: US 7,729,548 B2
(45) Date of Patent: Jun. 1, 2010

(54) SYSTEM FOR HIGH BANDWIDTH IMAGING ACROSS PC CHIPSETS AND CUSTOM ASIC'S

(75) Inventors: Perry Lea, Boise, ID (US); Justen R Meltz, Boise, ID (US); Shawn Rosti, Boise, ID (US); Steven Lee Holland, Boise, ID (US); Charles Rekiere, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 975 days.

(21) Appl. No.: 11/496,103

(22) Filed: Jul. 31, 2006

(65) Prior Publication Data

US 2008/0025621 A1    Jan. 31, 2008

(51) Int. Cl.
*G06K 9/36*    (2006.01)
*G06K 9/46*    (2006.01)

(52) U.S. Cl. .................. 382/234; 382/302; 382/307

(58) Field of Classification Search ............... 382/162, 382/166, 234, 248, 302, 303, 304, 307; 345/505, 345/506, 519
See application file for complete search history.

(56) References Cited

U.S. PATENT DOCUMENTS

| 6,002,814 | A | * | 12/1999 | Chadez | 382/303 |
| 6,028,611 | A | * | 2/2000 | Anderson et al. | 345/506 |
| 6,289,138 | B1 | * | 9/2001 | Yip et al. | 382/307 |

* cited by examiner

*Primary Examiner*—Phuoc Tran

(57) ABSTRACT

An image processing system includes at least one processor having a plurality of PCI Express channels and at least two application specific integrated circuits. The application specific integrated circuits are communicatively coupled to the at least one processor by a first of the plurality of PCI Express channels and a second of the plurality of PCI Express channels. Multiple threads of execution are split between the at least two application specific integrated circuits.

8 Claims, 3 Drawing Sheets

SYSTEM FOR HIGH BANDWIDTH IMAGING ACROSS PC CHIPSETS AND CUSTOM ASIC'S

BACKGROUND

Known image processing systems such as light production presses, digital copiers and other print devices produce printed images by retrieving raw source (image) data from a scanner, processing the data through a series of transformations (i.e., image data flow), and ultimately sending the transformed data to a print engine. These operations are generally implemented by a combination of firmware and imaging architecture that include a PC processor (e.g., Intel and AMD chipsets), a memory, a communications bus and a hardware assist application specific integrated circuit (ASIC). The ASIC communicates with the PC processor through a PCI Express channel (i.e., a serial physical-layer communications protocol) located on the PC processor.

In known imaging systems, the image data flow is linear in that a single ASIC is configured to perform all data flow operations including image compression functions, color space conversions (CSC), video, traptoning, and input/output functions. An exemplary data flow for a known image processing system generally includes: (1) retrieving image data from a scanner or input/output (I/O) device; (2) performing necessary CSC; (3) compressing the data; (4) decompressing the data upon demand from the print engine; and (5) sending the data to the print engine. Consequently, the performance (i.e., speed) of the image processing system is, in part, limited by the bandwidth capabilities of the single ASIC.

Known image processing systems are further limited by architectural constraints of the PC processor that limit the image data flows (i.e., transformations in the image data) that are necessary for high speed image processing. For example, PC processors do not allow for peer to peer communication from one PCI Express channel to another. As a result, there is no way to direct memory access (DMA) data to a print engine when the engine is on a separate PCI Express channel.

Accordingly, the embodiments described hereinafter were developed in light of these and other drawbacks associated with image processing systems that employs a PC processor in communication with a single ASIC.

BRIEF DESCRIPTION OF THE DRAWINGS

The present embodiments will now be described, by way of example, with reference to the accompanying drawings, in which.

DETAILED DESCRIPTION

Introduction

A system and method for high bandwidth image processing across PC chipsets and custom application specific integrated circuits (ASICs) are provided. The system generally includes a PC processor having a memory module and at least two ASICs. Each ASIC is communicatively coupled to the PC processor through separate PCI Express channels that are located on the PC processor. Firmware drivers residing on the PC processor implement true parallel processing by using multiple threads of execution (i.e., two or more simultaneously running tasks) to spread the data flow to each ASIC.

In one embodiment, the threads of execution split the data pipeline into a front end and a back end for video traffic. In this configuration, the first ASIC is dedicated to upfront compression and possible color space conversions, while the second ASIC is dedicated to decompressing the data, performing a back end CSC, and transforming the data into acceptable print engine ready form. In this way, source data arriving from an input/output (I/O) device or scanner will flow through the front end, and pages requested by the print engine will eventually flow through the back end. These two independent pipelines run in parallel allowing images (i.e., pages) to be scanned in quickly, while also satisfying the performance requirements of the print engine.

In another embodiment, image processing is further improved by load balancing between the first and second ASIC (i.e., front end and back end, respectively) based on immediate demands. In this embodiment, the ASICs are viewed and resources and utilized accordingly.

System Overview

Figure 1:
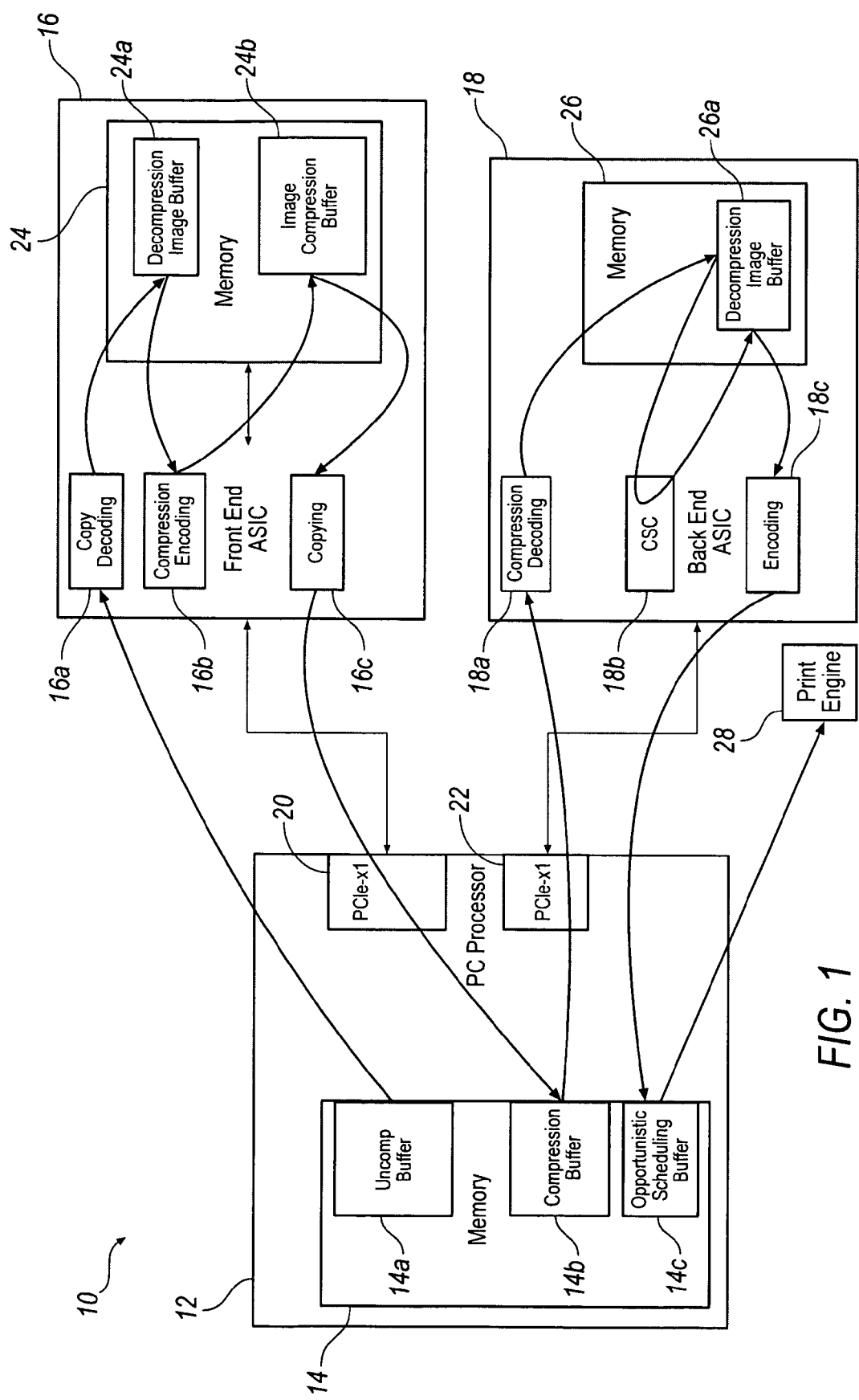
FIG. 1 illustrates an exemplary image processing system according to an embodiment.

FIG. 1 illustrates an exemplary image processing system 10 according to an embodiment. The system 10 includes a processor 12 in communication with a memory module 14 having hardware assist blocks 14a-14c. Specifically, memory module 14 includes an uncompressed image buffer 14a, a compression algorithm buffer 14b and an opportunistic scheduling buffer 14c. In one embodiment, compression algorithm buffer 14b employs a JPEG (i.e., a compression algorithm developed by the Joint Photographic Experts Group) or Grafit (i.e., an acronym for GuaRAnteed FIT compression) algorithm, while opportunistic scheduling buffer 14c implements traffic aided opportunistic scheduling (TAOS) buffering. One of ordinary skill in the art understands that hardware assist blocks in general can implement any type of lossy/lossless, compression/decompression, or predictable fit compression algorithms.

The system 10 further includes two application specific integrated circuits (ASICs) 16, 18 communicatively coupled to processor 12 through separate PCI Express channels 20 and 22. PCI Express channels are serial physical layer interconnect protocols that reside on PC processor 12.

ASICs 16, 18 each include multiple hardware assist blocks that are configured to provide high speed image processing services such as, but not limited to, compression algorithms, color space conversions (CSC), data movement, copying ability, rotation, and multi-function printer advanced feature accelerators. These processing services are firmware implemented using identical drivers (not shown) and are interchangeable with respect to each ASIC 16, 18.

An exemplary ASIC configuration, where each ASIC is responsible for a different set of image processing services through hardware assist blocks, is shown in FIG. 1. ASIC 16 includes hardware assist blocks for copy decoding 16a, compression encoding 16b, and copying 16c. ASIC 18 includes hardware assist blocks for compression decoding 18a, CSC 18b, and encoding 18c, which uses a method for opportunistic scheduling. As understood by one of ordinary skill in the art, the specific division of services for each ASIC 16, 18 is variable and not limited to the configuration shown in FIG. 1. In addition, compression or decompression algorithms may be JPEG or GRAFIT, and the method for opportunistic scheduling may include traffic aided opportunistic scheduling (TAOS) buffering.

In one embodiment of system 10, ASICs 16, 18 further include dedicated local memory modules 24, 26, respectively. Memory module 24 includes decompression image buffer 24a and image compression buffer 24b, while memory module 26 includes decompression image buffer 26a. Memory modules 24, 26 provide a staging area for intermediate data transforms, which alleviates bandwidth congestion on the PCI Express channels.

Exemplary Processes

Figure 2:
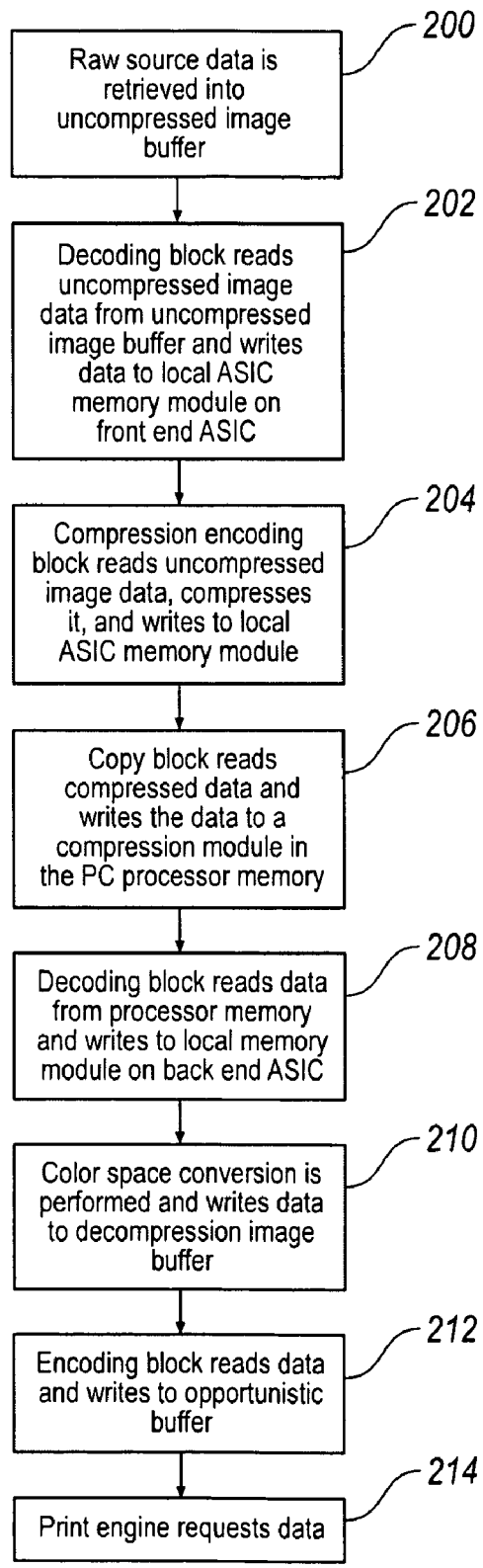
FIG. 2 is a flow diagram illustrating exemplary steps for processing an image using the image processing system of FIG. 1.

FIG. 2 illustrates an exemplary imaging process according to the image processing system of FIG. 1. References to physical components refer to those exemplary components illustrated in FIG. 1. At step 200, raw source (image) data is retrieved from an I/O device or scanner and stored in uncompressed image buffer 14a. At step 202, the decoding hardware assist block 16a of front end ASIC 16 reads the uncompressed image data stored in the uncompressed image buffer 14a and writes the data to the local ASIC memory module 24. The compression encoding block 16b at step 204 reads the uncompressed image data from local ASIC memory module 24, compresses it, and writes the compressed data to the image compression buffer 24b on local ASIC memory module 24. In one embodiment, the image data is compressed using JPEG or GRAFIT algorithms. At step 206, a direct memory access (DMA) engine in copy block 16c reads the compressed data from the image compression buffer 24b and writes the data across PCI Express channel 20 to compression buffer 14b in memory module 14. By implementing a local memory module on the front end ASIC 16 and localizing the intermediate transforms to local memory, the bandwidth pressure on PCI Express channel 20 is substantially reduced.

At step 208, decoding block 18a reads from compression buffer 14b, across PCI Express channel 22, the compressed image data and writes the data to the decompression image buffer 26a on local memory module 26. CSC, if necessary, is performed locally at step 210 from CSC block 18b and writes the image data back to decompression image buffer 26a. At step 212 encoding block 18c reads the image data from decompression image buffer 26a and writes it back to opportunistic scheduling buffer 14c across PCI Express channel 22. In one embodiment, encoding block 18c encodes the image data using traffic aided opportunistic scheduling (TAOS) buffering. At this point, the image data is in a print ready form. Consequently, at step 214 print engine 28 requests the print ready data and executes a print function.

Figure 3:
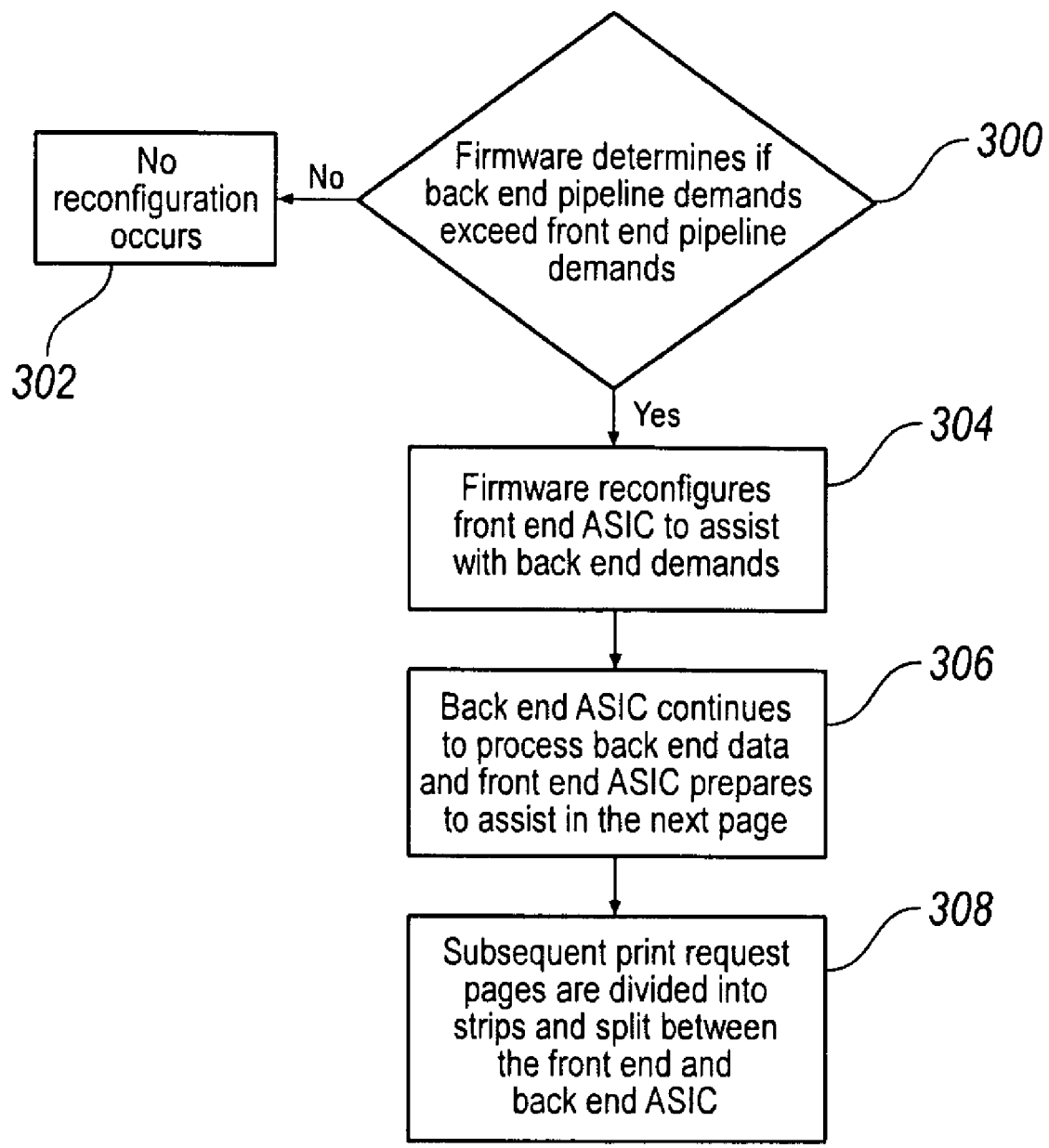
FIG. 3 is a flow diagram illustrating exemplary steps for performing a load balancing operation according to an embodiment.

In conjunction with the method for image processing described above, FIG. 3 illustrates an exemplary process for load balancing in light of the image processing system of FIG. 1. In this embodiment, the imaging transformations are divided into front end compressions and back end video, which allows the firmware to concentrate on either the front end demands or the back end demands. Back end video refers to preparing the image data to be sent to the print engine, while front end compression makes the image more manageable (generally from a size standpoint). The firmware initially designates the front end ASIC 16 to handle front end compressions, while the back end ASIC 18 is designated to handle back end video. However, if the back end video has higher throughput demands than the front end, then the front end ASIC 16 is reconfigured to assist in the back end transformations (e.g., color space conversions, rotations, etc.).

For example, at step 300, the firmware on PC processor 12 determines if the back end pipeline (i.e., demand for back end transformations) exceeds front end pipeline demands (i.e., incoming print jobs through I/O or scanner). At step 302, if the back end pipeline demands do not exceed the front end pipeline demands, no reconfiguration occurs. At step 304, if the back end demands exceed the front end demands, the firmware reconfigures the front end ASIC 16 for load balancing to assist with the back end demands and preventing the front end ASIC 16 from assisting in front end transformations. At step 306, ASIC 18 continues to process back end data and provide print ready data to print engine 28, while the front end ASIC 16 prepares to assist with the next successive page of image data. In other words, back end ASIC 18 processes the current page "N", while front end ASIC 16 is configured to transform page "N+1." In successive print requests, the pages are split into individual strips at step 308 and divided between front end ASIC 16 and back end ASIC 18 in an alternating manner. This process continues until the firmware reconfigures the ASICs 16, 18 to function according to the initial front end and back end designations (i.e., front end compressions and back end video). In one embodiment, the firmware returns ASICs 16, 18 to the initial designations upon the initiation of a new print job.

While the present invention has been particularly shown and described with reference to the foregoing preferred embodiment, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and system within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiment is illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A method of image processing, comprising:
   storing uncompressed source data in a processor;
   performing front end compression on said source data by:
     reading into a first application specific integrated circuit said uncompressed source data;
     compressing said source data; and
     writing compressed source data to said processor;
   performing back end transformations on said compressed source data by:
     reading into a second application specific integrated circuit said compressed source data;
     performing color space conversion on said compressed source data; and
     writing said compressed source data to said processor.

2. The method of claim 1, wherein performing front end compression on said source data further includes reading said uncompressed data into a local memory module in said first application specific integrated circuit.

3. The method of claim 2, wherein performing front end compression on said source data further includes writing said compressed source data to said local memory module prior to writing said compressed source data to said processor.

4. The method of claim 1, wherein performing back end transformations on said source data further includes reading said compressed data into a local memory module on said second application specific integrated circuit.

5. The method of claim 1, further comprising compressing said source data using a compression algorithm.

6. The method of claim 5, wherein said compression algorithm is one of a JPEG algorithm or a guaranteed compression fit algorithm.

7. The method of claim 1, wherein performing back end transformations further includes encoding said compressed source data prior to writing said compressed source data to said processor.

8. The method of claim 7, wherein said compressed source data is encoded using traffic aided opportunistic scheduling.

* * * * *